Dec. 25, 1923.　　　　　　　　1,478,466
L. W. ANDERSON
TUNNELING MACHINE
Filed Oct. 14, 1918　　　10 Sheets-Sheet 6

WITNESSES:
W. C. Smith

INVENTOR.
Louis W. Anderson
BY:-
Jones, Addington Ames Leibold
ATTORNEYS

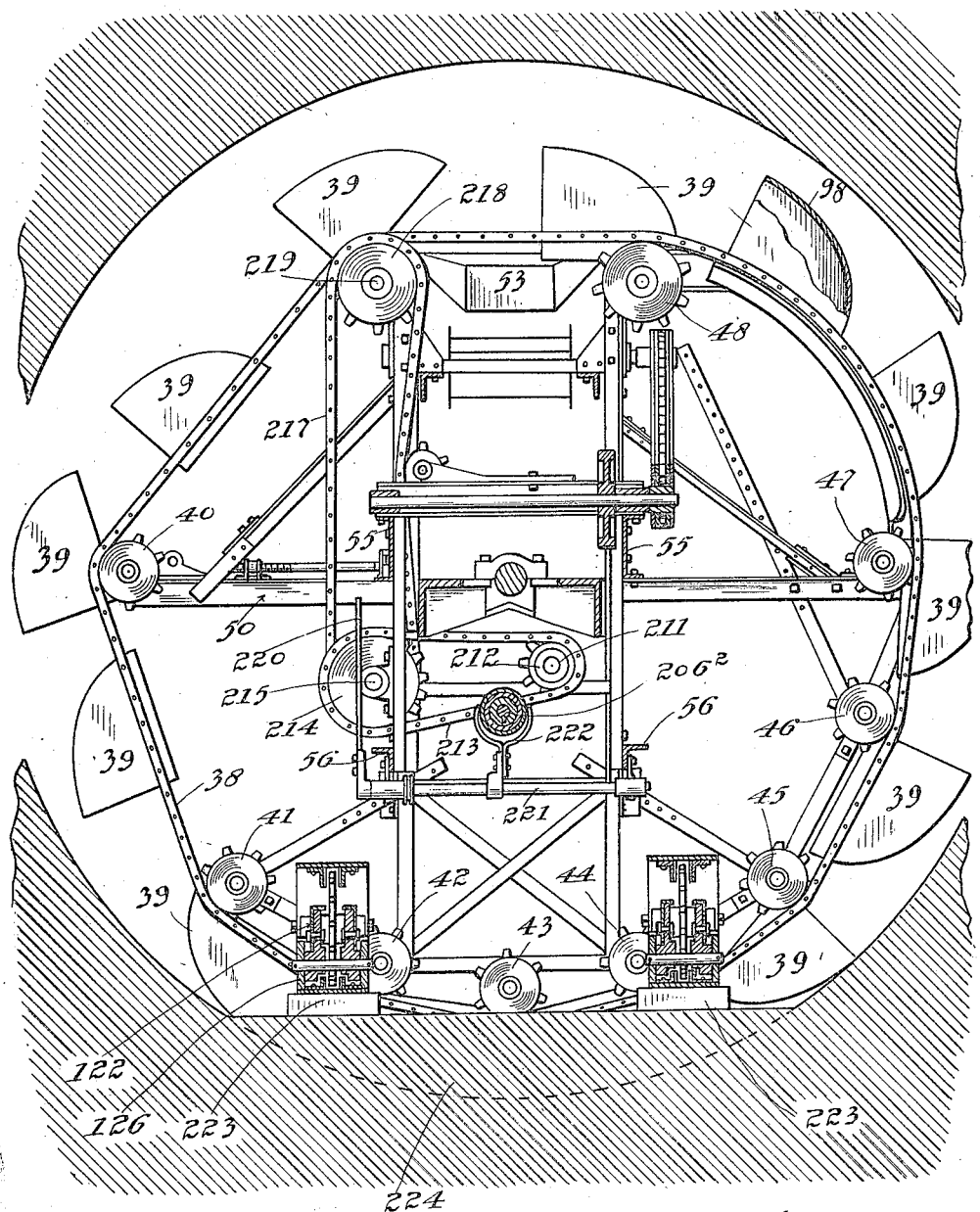

Dec. 25, 1923.
L. W. ANDERSON
1,478,466
TUNNELING MACHINE
Filed Oct. 14, 1918   10 Sheets-Sheet 8
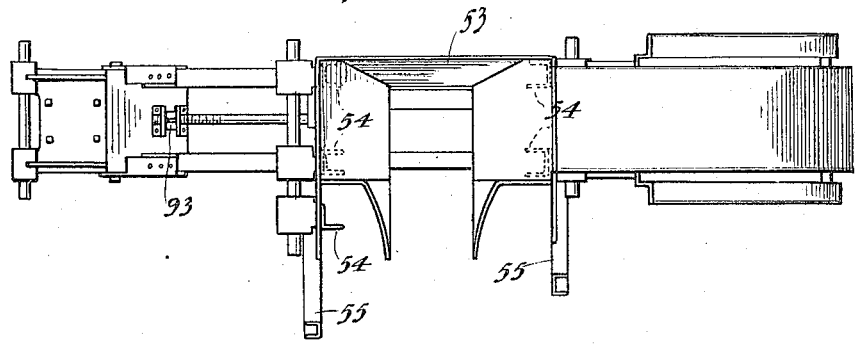
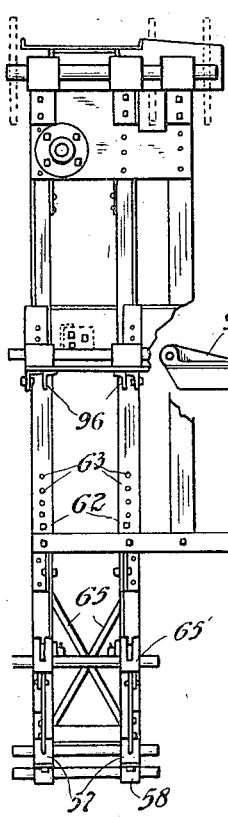
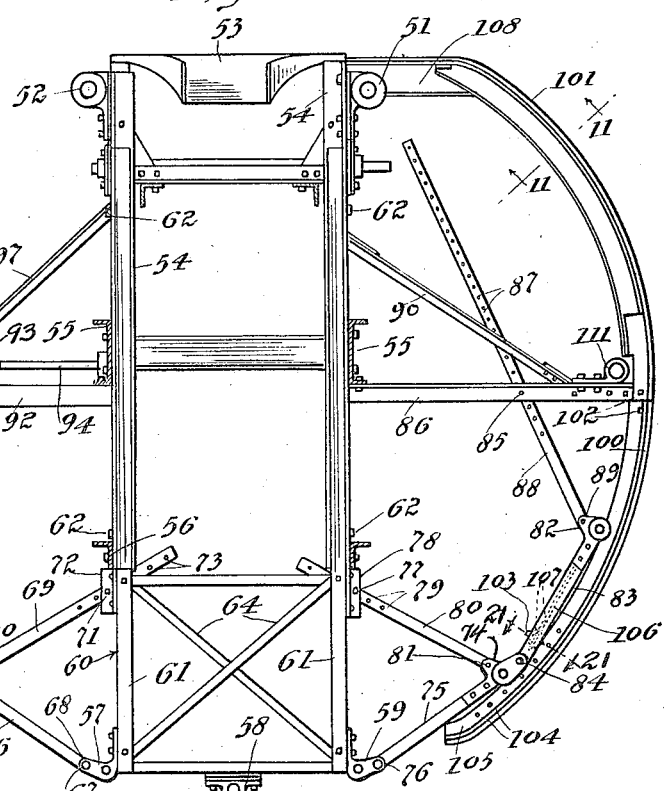
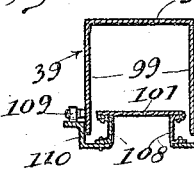

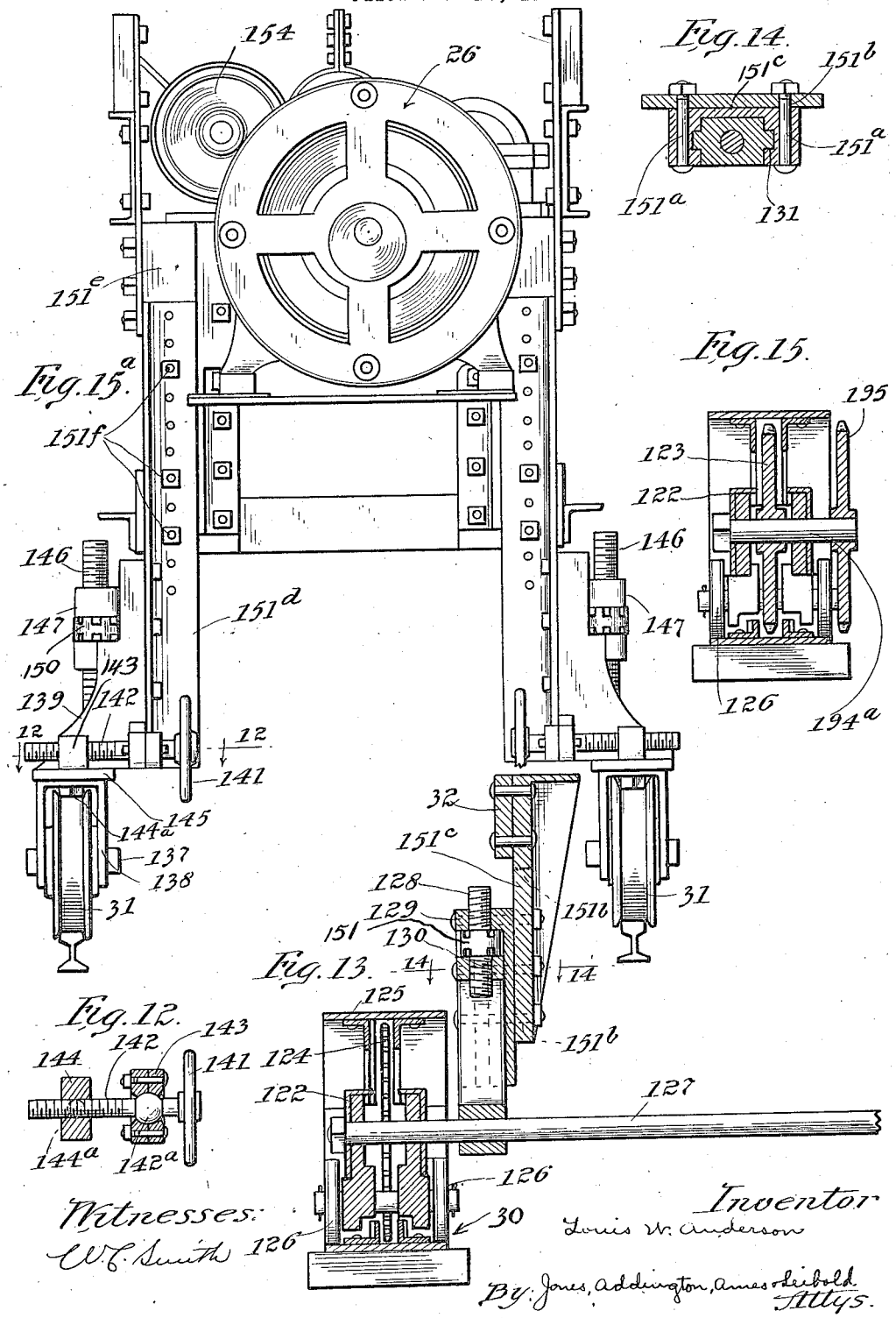

Dec. 25, 1923. 1,478,466
L. W. ANDERSON
TUNNELING MACHINE
Filed Oct. 14, 1918 10 Sheets-Sheet 10
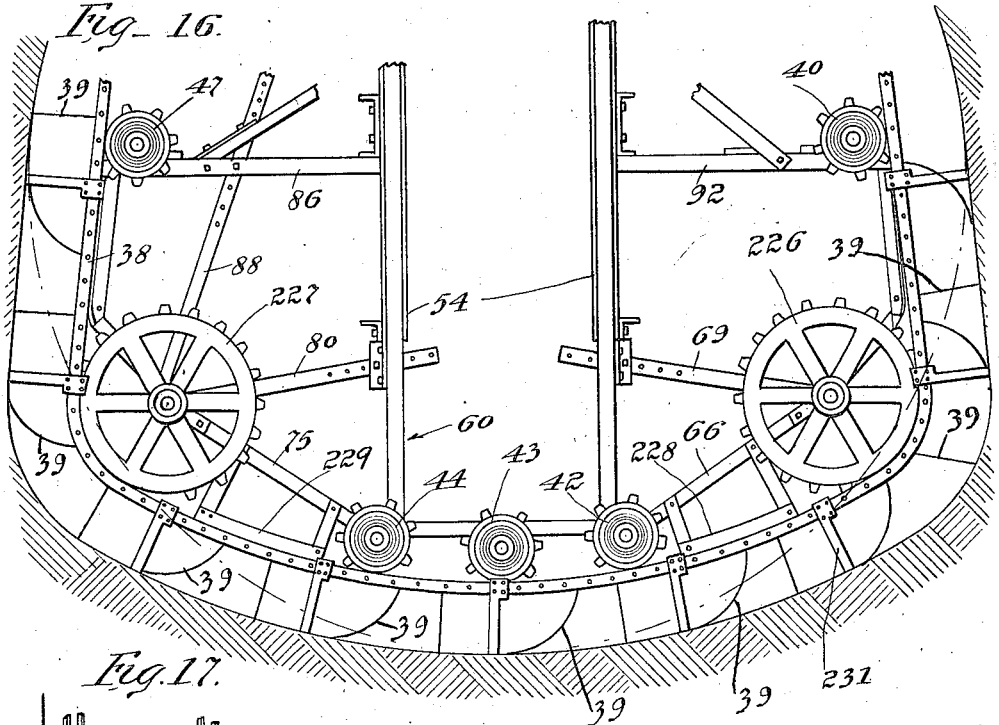
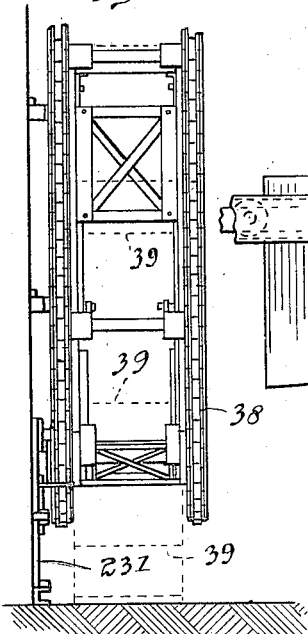
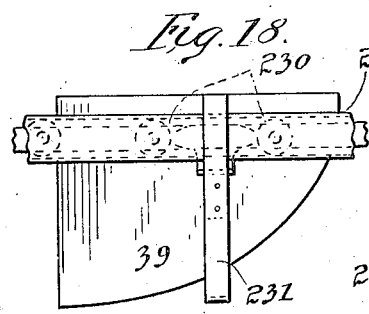
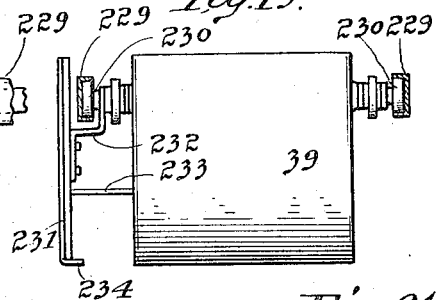
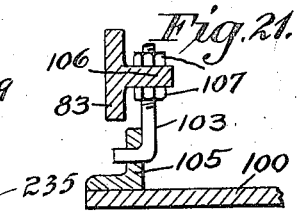
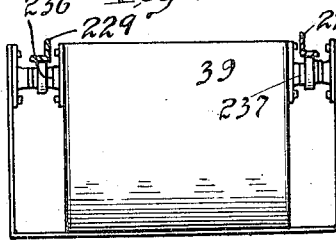
Inventor:
Louis W. Anderson
By Jones, Addington, Ames & Seibold
Attys.

Patented Dec. 25, 1923.

1,478,466

UNITED STATES PATENT OFFICE.

LOUIS W. ANDERSON, OF GRAND RAPIDS, MICHIGAN, ASSIGNOR TO THE TUNNEL & SEWER MACHINE ENGINEERING COMPANY, OF BUFFALO, NEW YORK, A CORPORATION OF NEW YORK.

TUNNELING MACHINE.

Application filed October 14, 1918. Serial No. 257,965.

*To all whom it may concern:*

Be it known that I, LOUIS W. ANDERSON, a citizen of the United States, residing at Grand Rapids, in the county of Kent and State of Michigan, have invented new and useful Improvements in Tunneling Machines, of which the following is a full, clear, concise, and exact description, reference being had to the accompanying drawing, forming a part of this specification.

My invention relates to tunneling-machines.

One of the objects of my invention is to provide an improved tunneling machine having a pick-up mechanism for picking up the material loosened by the boring mechanism, which pick-up mechanism will be adjustable for bores of different dimensions.

A further object of my invention is to provide an improved tunneling machine in which the carriage that carries the boring mechanism is adjustable for controlling the direction of the boring operation.

A further object of my invention is to provide a tunneling machine having improved driving means for controlling the movement of the carriage which carries the boring mechanism.

A further object of my invention is to provide a tunneling machine in which a link-belt pick-up mechanism is used for making irregular-shaped bores.

A further object of my invention is to improve the general construction of tunneling machines of the type disclosed in this application.

Further objects will appear from the detailed description to follow and from the appended claims.

In the drawings, in which two embodiments of my invention are shown—

Fig. 7 is a section on the line 7—7 of Fig. 1;

Fig. 8 is a view showing the framework which supports the pick-up mechanism;

Fig. 9 is a side view of the part shown in Fig. 8;

Fig. 10 is a plan view of the part shown in Fig. 8;

Fig. 11 is a sectional view through one of the pick-up buckets and the track;

Fig. 12 is a section on the line 12—12 of Fig. 15ª showing the mechanism for steering the carriage;

Fig. 13 is a section on the line 13—13 of Fig. 1;

Fig. 14 is a section on the line 14—14 of Fig. 13;

Fig. 15 is a section on the line 15—15 of Fig. 1;

Figure 1:
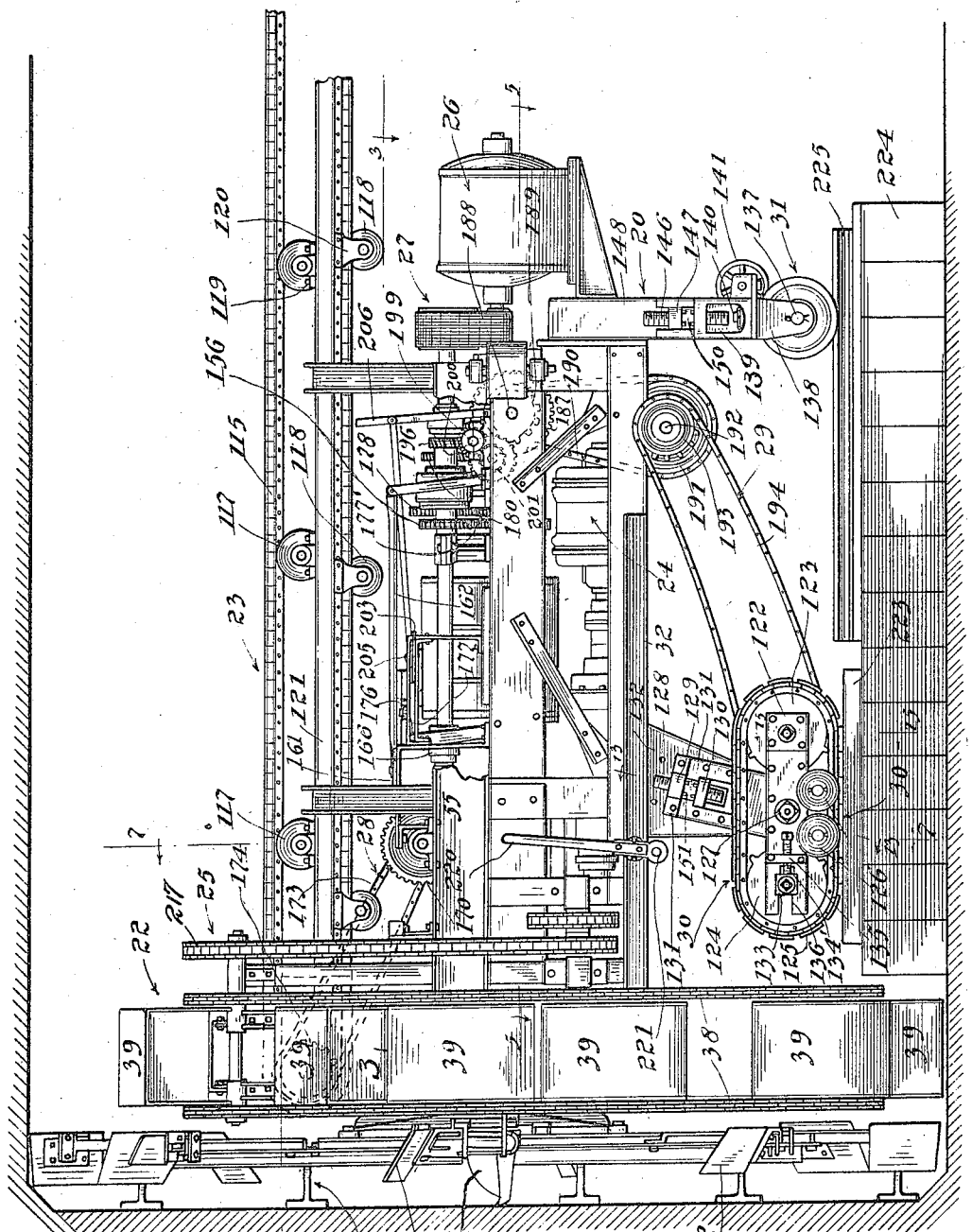
Figure 1 is a side elevation of a tunneling machine.
Figure 2:
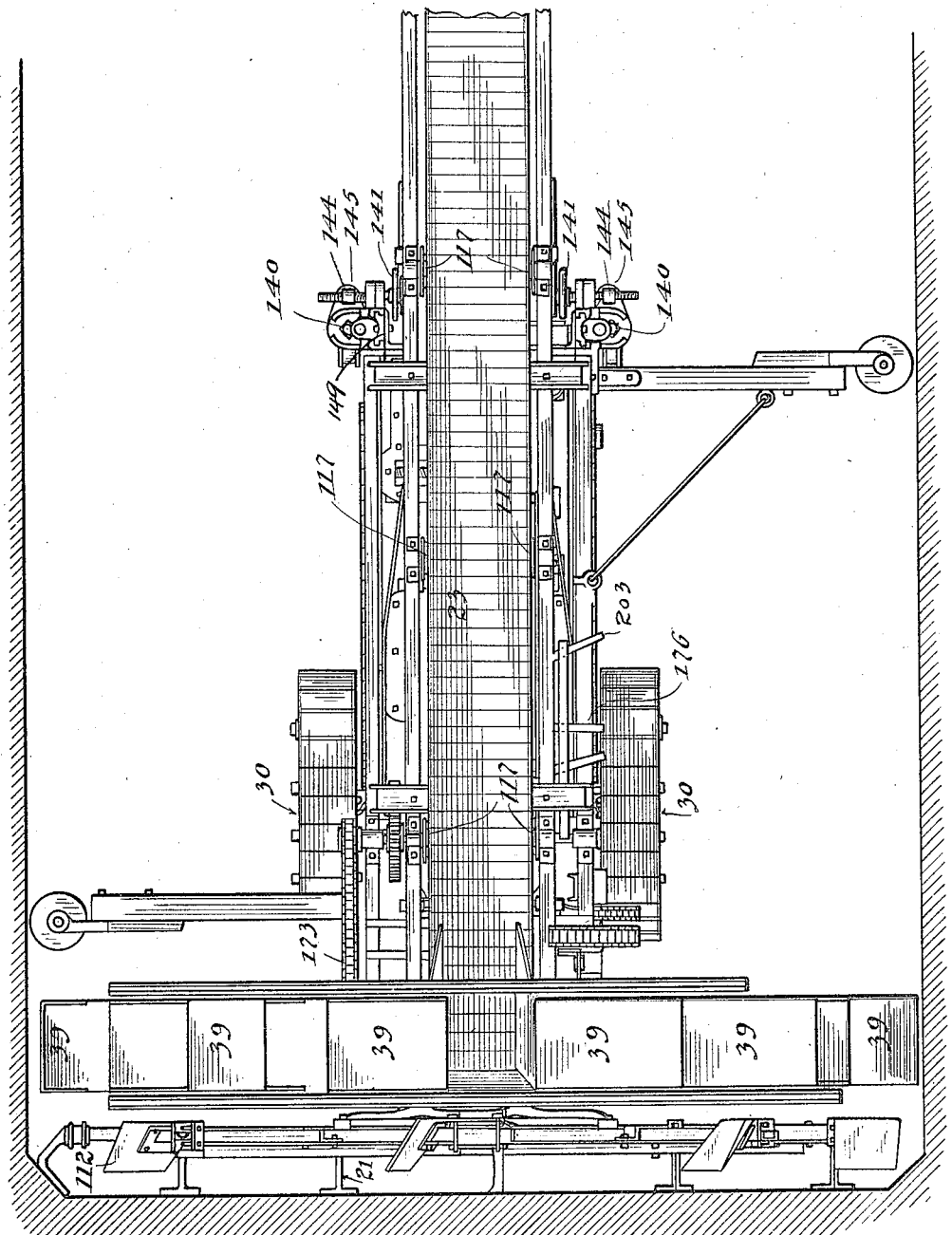
Fig. 2 is a plan view.
Figure 3:
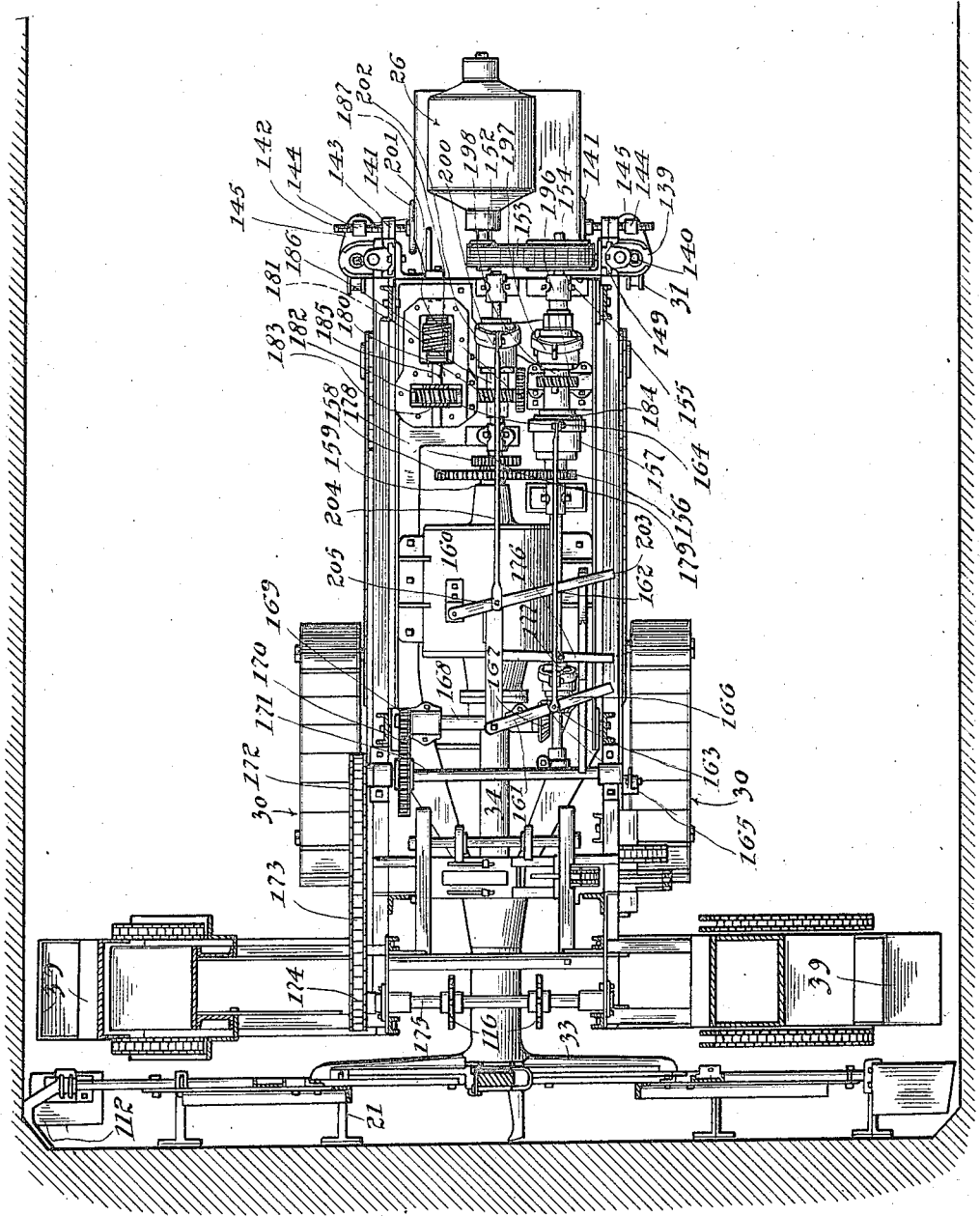
Fig. 3 is a section substantially on the line 3—3 of Fig. 1.

Fig. 15ª is a rear end view of the carriage and associated parts;

Fig. 16 is a view showing a different form of the pick-up mechanism;

Fig. 17 is a side elevation of the pick-up mechanism shown in Fig. 16;

Fig. 18 is a side view of the bucket of Fig. 16;

Fig. 19 is a rear view of the bucket with one form of bucket cutter;

Fig. 20 is a front view of a different form of bucket cutter, and

Fig. 21 is a section on the line 21—21 of Fig. 8.

The tunneling machine shown as illustrating my invention comprises a motor-propelled carriage 20, boring or excavating mechanism 21 supported by said carriage, link-belt pick-up mechanism 22 for scraping up the excavated material and also supported by said carriage, conveyor mechanism 23 for receiving the material scraped up by the pick-up mechanism 22 and conveying it away from the front end of the machine, a motor 24 and transmission mechanism 25 for driving the link-belt pick-up mechanism, a second motor 26, transmission mechanism 27 from the motor 26 to the boring or excavating mechanism 21, transmission mechanism 28 for driving the conveyor mechanism 23 (which receives the material from the pick-up mechanism) from the motor 26, and transmission mechanism 29 for driving the traction caterpillar mechanism 30 of the carriage 20 from the motor 26.

To give a general idea of the machine, it is here stated that both the front and the rear ends of the carriage are vertically adjustable; that the carriage is dirigible by an adjustment of the rear wheels 31 thereof; that the link-belt pick-up mechanism 22 travels in a direction opposite to that of the boring or excavating mechanism; and that the carriage can be driven forwardly at a comparatively low speed, and rearwardly at a comparatively high speed. By reversing the motor, the machine can be driven backward at a slow speed and forward at a high speed.

The carriage 20 comprises, in addition to the caterpillar traction mechanism 30 and the guiding and supporting wheels 31, a frame 32 supported by the caterpillar mechanism 30 and the wheels 31, and supporting the motors 24 and 26 and the various mechanisms driven thereby.

The boring mechanism 21 comprises a cross-shaped boring head 33 secured on the boring shaft 34, a pair of cross-arms 35 disposed at right-angles to each other and detachably secured to the head 33, a plurality of cutters 36 detachably secured to the cross-arms 35, and an auger 37 also detachably secured to one of the cross-arms 35 for taking out the central portion of the bore.

The link-belt pick-up mechanism comprises a pair of link-belts or sprocket-chains 38 and a series of pick-up buckets 39 secured to the sprocket-chains 38.

In order to give a general idea of the link-belt pick-up mechanism, it is here stated that this comprises a series of pick-up buckets secured to a link-belt, the buckets traveling in a direction opposite to that in which the cutters on the boring-bar travel, the buckets in their travel along the lower portion of the tunnel being made to follow closely the circumference of the cut made by the boring mechanism, so as to scrape up cleanly the material excavated by the boring mechanism, the path of travel of the buckets along the lower portion of the bore being adjustable, so that it can be used for tunnels of different bores.

While the buckets are shown and described as traveling in the opposite direction to the boring mechanism, it is to be stated that they may be made to travel in the same direction without materially affecting the results of operation. However, when the travel is in the opposite direction, the boring mechanism throws the dirt in front of the buckets in a better position to be picked up than when the travel is in the same direction.

Also, when the travel is in opposite directions, the reaction on the buckets tends to counterbalance the rotational effect of the reaction on the cutters.

More in detail, the pick-up mechanism comprises a pair of endless link-belts or sprocket-chains mounted to travel on a series of sprocket-wheels or flanged rollers located so as to cause the belts to travel in approximately circular paths, a series of pick-up buckets 39 secured to the link-belts 38 for scraping up the material excavated by the boring mechanism, sprocket-wheels 40, 41, 42, 43, 44, 45, 46, 47, 48, and 49 on which the sprocket-chains 38 travel, and a frame 50 on which the sprocket-wheels 40 to 49 and associated mechanisms are supported.

The upper sprockets 48 and 49, which determine the position of the buckets when they dump the material onto the conveying mechanism 23, are mounted in bearings 51 and 52, respectively, which may be fixed relatively to the chute 53 for receiving the material from the buckets 39 and directing it onto the conveyor 23. The bearings 51 and 52 and chute 53 are secured to and supported by five vertical angle-irons 54 (Figs. 8 and 10). These vertical angle-irons are secured to and supported by a pair of longitudinally-extending horizontal channel-irons 55 and angle-irons 56, the channel members 55 and angle-irons 56 forming part of the main frame 32.

The three lowermost pairs of sprockets—42, 43, and 44—which guide the buckets in the lowermost part of their travel, are mounted in bearings 57, 58, and 59, respectively, which bearings are secured to a vertically-adjustable frame 60. This vertically-adjustable frame is slidably supported with respect to the vertical angle-irons 54 and comprise four upright angle-irons 61, which engage the upright angle-irons 54 and are adjustable longitudinally with respect thereto, being held in adjusted position with respect thereto by means of bolts 62, which extend through holes in the angle-irons 54 and can be inserted through any of a series of holes 63 in the angle-irons 61, whereby the angle-irons 61 can be secured in various positions of vertical adjustment.

The angle-irons 61 may be held in position and braced with respect to each other by means of diagonal braces 64 and 65.

The sprockets 41, which engage the chains 38 on the descending side, are supported in bearings $65^1$, which are secured to arms 66 pivotally mounted at 67 between lugs or ears 68 formed integral with the bearings 57. The bearing $65^1$ is made adjustable about the pivot 67 in order that the buckets may be made to follow closely the circumference of different size bores. The bearings $65^1$ are held in their adjusted position by means of links 69 pivotally secured at 70 to the bearing $65^1$ and adjustably connected with the vertically-adjustable frame 60 by means of a bolt 71 extending through an opening in an angle-clip 72 secured to the vertical angle-irons 61, said bolt 71 being capable of insertion in any one of a series of holes 73 in the links 69.

In a similar manner, the bearings 74 which support the sprockets 45 are secure to adjustable arms 75 pivotally mounted at 76 on the bearings 59. The adjustable arms 75 are held in desired adjusted position by means of bolts 77 extending through openings in the clip 78 secured to the angle-irons 61, and through any one of the series of openings 79 in the links 80, which links are pivotally connected at 81 with the bracket 74. The sprockets 46 are mounted in bearings 82, which are secured to adjustable arms 83 pivotally mounted at 84 on the brackets 74. The bearings 82 are held in desired adjusted position by means of bolts 85 extending through openings in the laterally-extending angle-irons 86 and capable of insertion through any one of the series of holes 87 in the links 88, which are pivotally connected at 89 to the bracket 82. The angle-irons 86 are secured to the vertical angle-irons 54 and are supported in position by means of diagonal braces 90. The adjustable connection between the links 88 and angle-iron 86 permits of the vertical adjustment of the frame 60, as well as the adjustment of the arm 83 about its pivot 84.

The adjustment described of the bearings 65', 57, 59, 74, and 82 is for the purpose of making the buckets during the lower portion of their travel follow closely the line of cut made by the boring mechanism. This adjustment of the chain to vary its travel along the bottom of the cut necessitates a chain-tightening and slacking device. This is provided by making the bearings 91 for the sprockets 40 adjustable in and out on the laterally-extending angle-irons 92, which are secured to the vertical angle-irons 54. This lateral adjustment of the bearings 91 is secured by means of a nut 93 having a threaded engagement with a bolt or rod 94 secured to the channel 55. The nut 93 operates between angle-clips 95 secured to the bearing 91. The bearing 91 is guided in its movement with respect to the angle-irons 92 by means of angle-iron guides 96 secured to the bearing 91 and engaging the angle-irons 92 to guide the bearing 91. The angle-irons 92 are firmly supported in position with respect to the angle-irons 54 by means of the angle-braces 97.

The buckets 39 are secured to the sprocket-chains 38 in such a manner that they will be held in proper position to scoop up the excavated material, carry it up, and dump it into the chute 53. Each of these buckets comprises a curved bottom portion 98 (Fig. 11) and two flat side portions 99 between which the bottom portion 98 extends. These buckets after scraping along the bottom of the tunnel travel upwardly toward the chute 53. During this portion of the travel the buckets are turned upside down, so that when they reach the chute the open side is down. In order to prevent the material in the buckets from dropping out before it reaches the chute, two curved baffle-plates 100 and 101 are provided, located opposite the open sides of the buckets on the ascending run of the link-belt. These baffle-plates extend substantially from one to the other of the side portions 99 of the buckets and prevent the material from falling out of the buckets. The upper baffle-plate 101 extends up to the chute 53 and keeps the material in the bucket until it reaches the chute 53. The lower plate 100 extends up to the second plate 101 and is pivotally mounted at 102 on the horizontally-extending angle-iron 86. The lower end of the baffle-plate 100 is adjustably connected with the arm 83 so as not to interfere with the adjustment of the bearings 74 and 82. This adjustable connection may be effected by means of an L-shaped bolt 103, which may be inserted in any one of a series of bolt-holes 104 in an angle-iron 105 secured to the rear of the baffle-plate 100. This bolt 103 extends through a hole in the rib 106 on the arm 83 and is clamped to the rib by means of clamping nuts 107. The baffle-plate 101 is supported by means of a pair of curved channel members 108, these channel members being secured at their upper ends to the angle-irons 54 and at their lower ends to the angle-irons 86.

In order to cause the buckets 39 to follow the curve of the baffle-plate 101 and run easily, the bucket chains are provided with rollers 109, which engage the curved tracks 110 formed by Z-bars secured to the channel members 108.

The sprockets 47, which guide the link-belts 38 at that point of their travel adjacent the junction of the baffle-plate 100 and 101 are mounted in bearings 111.

For sweeping the material excavated by the boring mechanism over into the path of the link-belt pick-up mechanism, a series of diagonally-disposed sweeps or plows 112 are secured at the outer ends of the cross-arms 35 and to auxiliary arms 113 secured at their inner ends to the boring head 33, being supported intermediate their length by angle-irons 114, which angle-irons are secured at their ends to the cross-arms 35.

The conveyor mechanism 23 comprises an endless link-belt 115, one end of which extends beneath the chute 53 and over the sprocket-wheels 116, a series of rollers 117 supporting the upper run of the link-belt 115, and a second series of rollers 118 for supporting the lower run of the link-belt.

The rollers 117 and 118 are mounted in pivotal bearings 119 and 120, respectively, which bearings are mounted on the longitudinally-extending frame members 121.

A standard rubber or canvas conveyor or belt with suitable rollers could be used instead of the link belt 115.

The caterpillar mechanism 30, which supports the front end of the machine, comprises two caterpillars, one for each side of the machine. These are similar in construction and a description of one will suffice for both. Each caterpillar comprises a frame 122, a pair of sprockets 123 and 124 mounted in bearings on the frame 122, a link-belt 125 extending over the sprockets 123 and 124, and two pairs of rollers 126 for engaging the lower run of the link-belt 125 to prevent it from sagging between the sprockets 123 and 124.

The frames 122 on both sides of the machine are mounted so as to be capable of rocking movement on a transversely extending shaft 127. The main frame 32 of the machine is vertically adjustable with respect to this shaft 127. This vertical adjustment of the frame 32 is found necessary where the machine is working in a shield and the machine is running low. By quickly raising the cutting end of the machine it can be brought back to proper position. This vertical adjustment of the frame 32 with respect to the shaft 127 is accomplished by means of a right and left-hand screw 128, the upper end of which has a threaded engagement with a bracket 129 secured to the main frame 32, and the lower end of which has a threaded engagement with the slide 130 in which the shaft 127 of the caterpillar is secured. The slide 130 is slidable in suitable guides 131 on the bracket 129.

For adjusting the tension of the link-belt 125 of the caterpillar, the bearing 133 for the sprocket 134 is made adjustable by means of a screw 134' having a threaded engagement with a bracket 135 secured to the frame 122. The bearing 133 is slidable in a guideway 136 of the frame 122.

In order to direct the travel of the machine to one side or the other as desired and up or down as desired, the wheels 31 which support the rear end of the machine are mounted to swivel on vertical axes, and the frame 32 is made vertically adjustable with respect to these wheels 31.

The mounting of the wheels 31 on the right and left-hand sides of the machine is similar in construction and a description of one will suffice for both. Each wheel 31 is mounted on a pin 137, which pin is mounted in a yoke 138. The yoke 138 is mounted to swivel on brackets 139 by means of a pin 140 extending through registering openings in the brackets and yoke. The yoke 138, in which the wheel 31 is mounted, can be swung about the pin 140 by means of the handwheel 141 secured to a threaded rod or shaft 142, which has a ball-and-socket connection 142$^a$ with the extension 143 of the bracket 139 and has a threaded connection with a nut 144, which nut has a pivotal connection 144$^a$ with an extension 145 of the bracket 138.

The frame 32 is vertically adjustable with respect to the wheels 31 by means of a right and left-hand screw 146, the lower end of which has a threaded engagement with the bracket 139 and the upper end of which has a threaded engagement with a bracket 147 secured to the leg 148 of the frame 32. The bracket 139 is slidably mounted on suitable guides 149 on the bracket 147, so that turning the screw 146 will cause a sliding movement of the bracket 139 with respect to the bracket 147, and, hence, a vertical adjustment of the rear end of the frame 32.

The screw 146 may be provided with a suitable ratchet-head 150 for engagement with a forked ratchet or lever which is used for rotating the screw 146. In a similar manner the screw 128 for the vertical adjustment of the front end of the frame is provided with a ratchet-head 151.

In order to adjust the height of the boring mechanism for different bores, the brackets 129 and 149 are all made vertically adjustable with respect to the carriage, so that both the front and rear ends of the carriage may be raised, and the center of the boring bar will be changed with respect to the caterpillars 30 and the rear wheels 31.

For this vertical adjustment of the front brackets 129, the brackets themselves are provided with bolt-holes to receive bolts 151$^a$, which bolts extend through registering openings 151$^b$ in the bracket 151$^c$, which is secured to the frame 32. The number of holes 151$^b$ is greater than the number of holes 151$^a$, and the arrangement of these holes with respect to the bolts is such that the bolts may be made to enter different sets of holes to vary the position of the carriage 32 with respect to the caterpillars 30.

Figure 4:
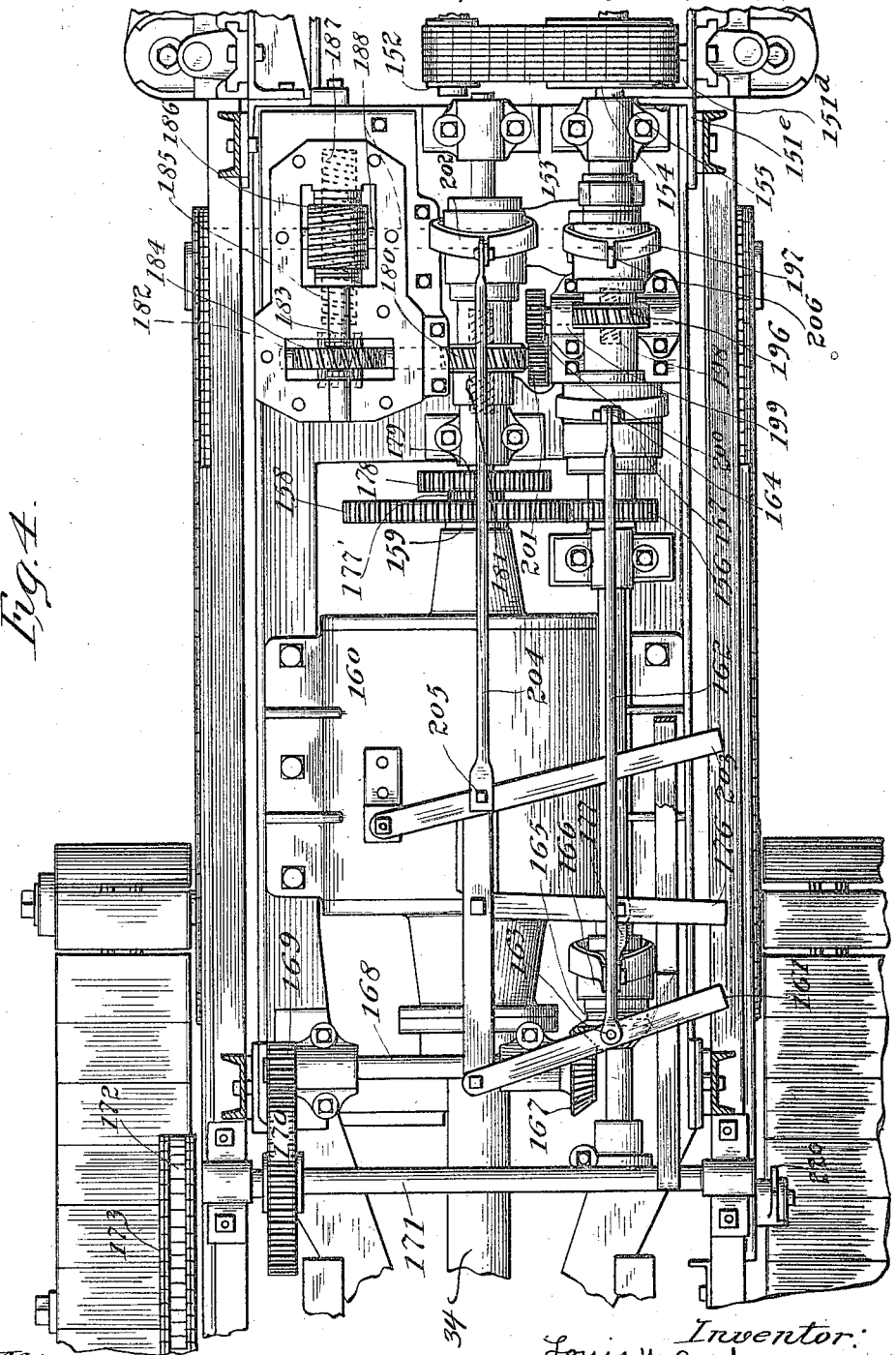
Fig. 4 is an enlarged sectional view of the rear portion of the machine taken on the same line as the section of Fig. 3.

In a similar manner the rear end of the carriage is vertically adjustable for different sizes of bores. For this vertical adjustment of the rear end of the machine the brackets 147 are secured to angle-irons 151$^d$, which angle-irons can be secured in various positions of vertical adjustment with respect to the angle-irons 151$^e$ (Figs. 4 and 15$^a$) by means of bolts 151$^f$ extending through registering openings in the angle-irons 151$^d$ and 151$^e$.

The adjustment of the carriage with respect to the caterpillars and the rear wheels by means of the screws 128 and 146 is principally for the purpose of keeping the boring mechanism working in the right direction; that is, by means of these screws the boring bar may be directed upwardly or downwardly. The adjustment of the carriage with respect to its support by means of the bolts 151ª and 151ᶜ is mainly to change the machine for bores of different dimensions.

The transmission mechanism 27 from the motor 26 to the boring mechanism 21 comprises a sprocket-wheel 152 secured to the shaft of the motor 26, a sprocket-chain 153 meshing with the sprocket-wheel 152, a sprocket-wheel 154 meshing with the chain 153, a shaft 155 on which the sprocket-wheel 154 is mounted, a spur-gear 156 mounted on the shaft 155, a clutch 157 for connecting and disconnecting the spur-gear 156 with respect to the shaft 155, a spur-gear 158 meshing with the spur-gear 156, a shaft 159 on which the spur-gear 158 is mounted, a shaft 34 on which the boring-head is mounted, and a planetary speed-reducing mechanism 160 between the shaft 159 and the shaft 34. The clutch 157 which controls the operation of the boring mechanism 21 is operated by means of a hand-lever 161 and a link 162 having pivotal connection with the lever 161 at 163 and pivotally connected to the clutch at 164.

The transmission mechanism for the conveyor mechanism 23 which receives the excavated material from the pick-up mechanism comprises a bevel-gear 165 mounted on the shaft 155, a clutch 166 for connecting and disconnecting the bevel-gear 165 with respect to the shaft 155, a bevel-gear 167 meshing with the gear 165, a shaft 168 on which the gear 167 is secured, a spur-gear 169 secured to the shaft 168, a spur-gear 170 meshing with the spur-gear 169, a shaft 171 on which the spur-gear 170 is mounted, a sprocket-wheel 172 secured on the shaft 171, a sprocket-chain 173 meshing with the sprocket 172, a sprocket wheel 174 meshing with the chain 173, a shaft 175 on which the sprocket-wheel 174 is secured, and the sprocket wheels 116 which drive the link-belt 115 of the conveyor mechanism.

The clutch 166 which controls the operation of the conveyor mechanism 23 is operated by means of a pivoted hand-lever 176 and a link 177 connected with the clutch 166 and pivotally connected with the hand-lever 176.

The transmission for the forward drive of the caterpillars comprises a spur-gear 177' (Fig. 1) mounted on the shaft 159, a spur-gear 178 meshing with the spur-gear 177', a shaft 179 on which the spur-gear 178 is secured, a spiral gear 180 also secured on the shaft 179, a spiral gear 181 meshing with the spiral gear 180, a shaft 182 on which the spiral gear 181 is secured, a worm 183 secured on the shaft 182, a worm-wheel 184 meshing with the worm 183, a shaft 185 on which the worm-wheel 184 is secured, a worm 186 secured on the shaft 185, a worm-wheel 187 meshing with the worm 186, a shaft 188 (Fig. 1) on which the worm-wheel 187 is secured, a sprocket-wheel 189 secured on the shaft 188, a sprocket-chain 190 meshing with the sprocket 189, a sprocket and differential 191 driven from the sprocket-chain 190, a divided shaft 192 driven from the differential 191, a pair of sprockets 193 one on each side of the machine, secured to the shaft 192, a pair of sprocket-chains 194, one on each side of the machine, meshing with the sprockets 193, respectively, a pair of sprocket-wheels 195 (Fig. 15) on opposite sides of the machine, meshing with the sprocket-chains 194, respectively, and a pair of shafts 194ª on which are secured the sprocket-wheels 195 and the rear sprocket wheels 123 of the caterpillars, respectively.

The transmission mechanism for the quick rearward drive of the caterpillars comprises a spiral gear 196 mounted on the shaft 155, a clutch 197 for controlling the connection of the gear 196 with the shaft 155, a spiral gear 198 meshing with the gear 196, a shaft 199 on which the spiral gear 198 is mounted, a spur-gear 200 secured to the shaft 199, a spur-gear 201 meshing with the spur-gear 200, the shaft 182, on an extension of which the spur-gear 201 is mounted, and the driving mechanism previously described, including the worm 183, the worm-wheel 184, the shaft 185, worm 186, worm-wheel 187, shaft 188, sprocket-wheel 189, chain 190, differential 191, shaft 192, sprockets 193, sprocket-chain 194, and driving connection 195.

The slow-feed forward drive is controlled by means of a clutch 202 which connects and disconnects the spiral gear 180 with respect to the driving shaft 179. This clutch 202 is operated by means of a pivoted hand-lever 203 and a link 204 connected with the clutch 202 and pivotally connected with the lever 203 at 205.

The quick rearward movement of the caterpillars is controlled by means of the clutch 197. This clutch is controlled by means of a hand-lever 206.

Figure 5:
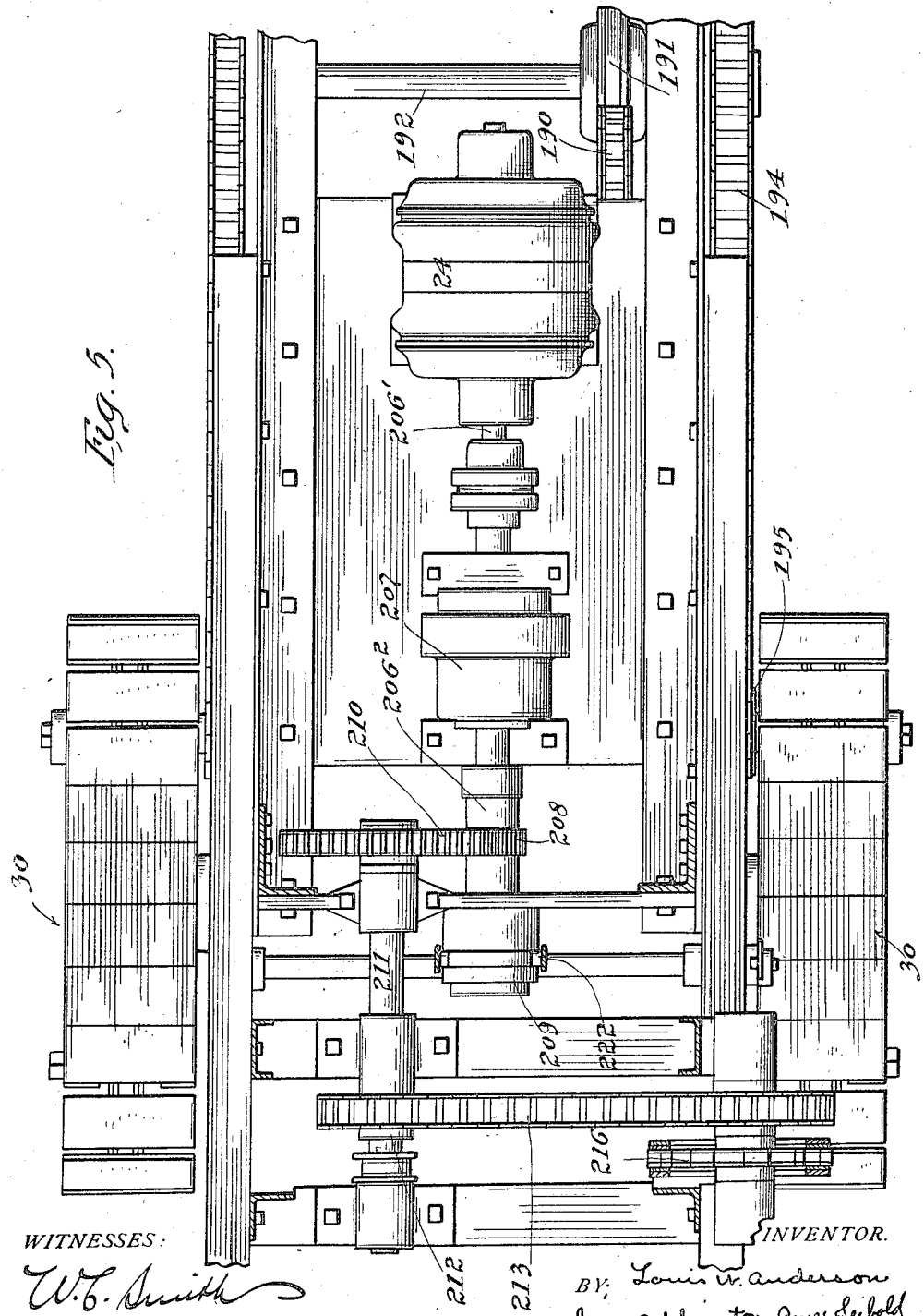
Fig. 5 is an enlarged sectional view of the rear portion of the machine on the line 5—5 of Fig. 1.
Figure 6:
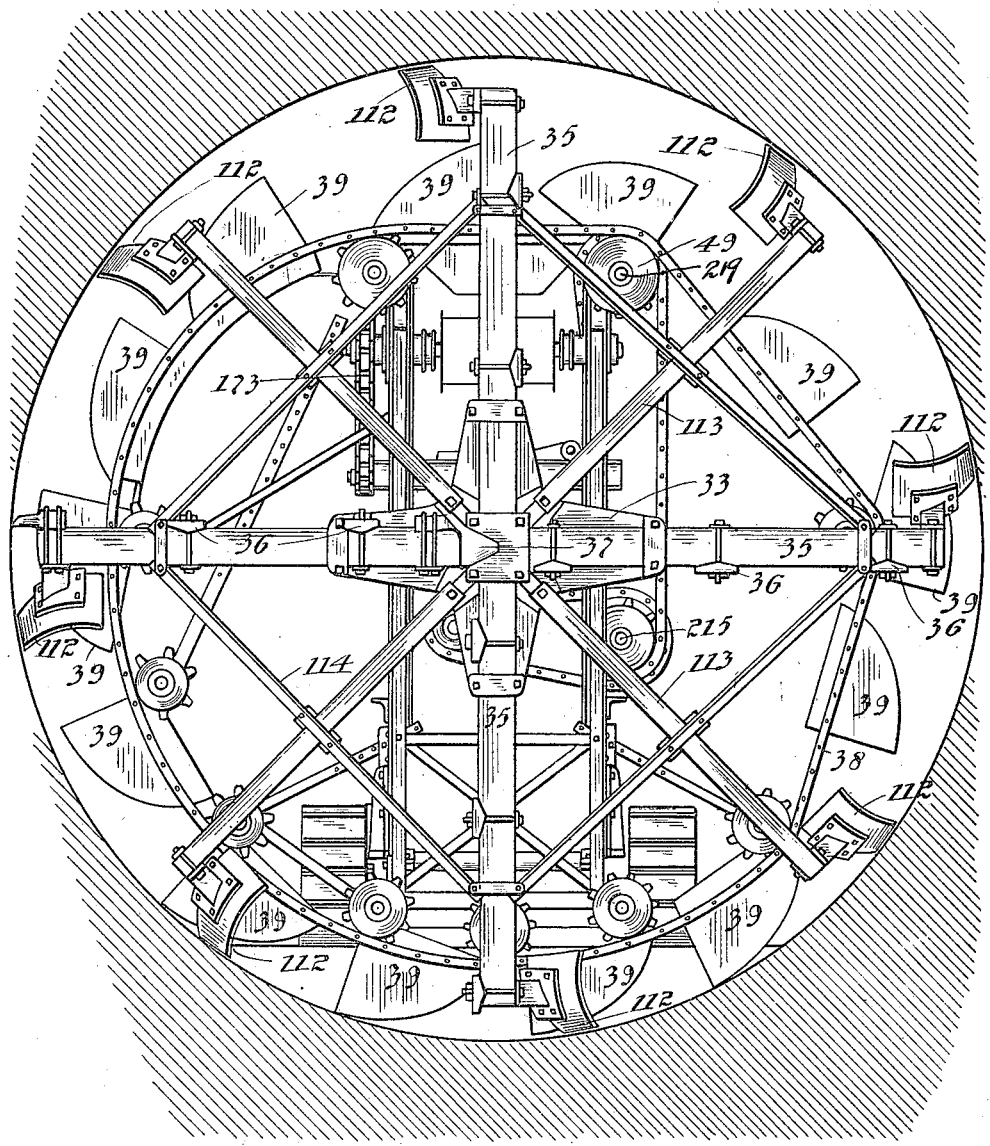
Fig. 6 is an elevation of the front end of the machine.

The transmission from the motor 24 to the link-belt pick-up 22 comprises a shaft 206', a shaft 206² in alignment with the shaft 206', a planetary speed-reduction mechanism 207 between the shafts 206' and 206², a gear 208 on the shaft 206², a clutch 209 controlling the connection between the shaft 206² and the gear 208, a gear 210 meshing with the gear 208, a shaft 211 on which the gear 210 is secured, a sprocket 212 secured on the shaft 211, a sprocket-chain 213 meshing with the sprocket 212, a sprocket 214 meshing with the chain 213, a shaft 215 on which the sprocket 214 is secured, a sprocket-wheel 216 secured on the shaft 215, a sprocket-chain 217 meshing with the sprocket 216, and a sprocket-wheel 218 meshing with the chain 217 and secured on the shaft 219, on which the gears 49 are secured. The sprockets 49 drive the link-belts 38 on which the pick-up buckets 39 are secured. The clutch 209 which controls the transmission for the pick-up mechanism is operated by means of a hand-lever 220 secured to a rock-shaft 221 to which a yoke 222 (Fig. 5) is secured and which yoke engages the clutch 209.

As previously described, manually-controlled clutches are provided for controlling the transmission to the boring mechanism, the transmission to the conveyor mechanism 23, the slow-feed forward drive of the caterpillars, the quick rearward drive of the caterpillars, and the transmission from the motor 24 to the link-belt pick-up mechanism.

If it is desired to move the machine forward at high speed, which may be the case when for any reason the machine has been backed away from the face of the cut and it is desired to move it quickly into position, the high-speed drive for the caterpillars may be put in operation by means of the proper controlling clutch, and the motor 26 reversed to drive the machine forward at high speed.

The normal operation of the machine is as follows: Assuming that the machine is in position with the boring mechanism 21 adjacent the face of the cut, the motors 24 and 26 are put in operation. The clutch 157 is then operated to start the boring mechanism 21; the clutch 209 is operated to start the pick-up mechanism; and the clutch 166 is operated to start the conveyor mechanism 23. With these parts in operation, the clutch 202 is then operated to start the slow-speed forward movement of the caterpillars, to feed the boring mechanism 21 against the face of the cut. The boring mechanism 21 excavates the material from the face of the cut, and the material drops down to the lower portion of the bore of the tunnel. This material is swept, by means of the plows 112, into the path of the link-belt pick-up mechanism 22. The material is then picked up by the buckets 39 and carried along the ascending side of the link-belt until the buckets reach the chute 53. The baffle-plates 100 and 101 prevent the material from dropping out of the buckets before they reach the chute 53. The material falls from the buckets 39 into the chute 53, which directs it onto the conveyor 23, which conveyor carries the material to the rear of the machine.

If it is desired to follow a curve, either up or down or laterally, this may be accomplished by swiveling the wheels 31 by means of the hand-wheel 141 and turning the right and left-hand threaded screws 146 by means of the ratchet-head 150 to move the rear end of the frame 32 up or down.

If for any reason it is desired to raise or lower the front end of the machine, this can be done by turning the double-headed screw 128 with the ratchet-head 151, which lifts the front end of the frame 32. For changing the machine to cut a tunnel of a different bore, cutter-arms of different lengths are substituted and the diameter of the face of the cut is accordingly changed.

To accommodate the machine to the change in cutter-arms, the brackets 139 which carry the rear wheels 31, and the brackets 129 which carry the caterpillars, are adjusted up or down, as required, with respect to the carriage, by means of the bolts 151$^a$ and 151$^f$.

To adjust the link-belt pick-up mechanism to this change of cut, the frame 60 is adjusted up or down as required, to bring the sprocket wheels 42, 43, and 44 the proper distance from the center of the cut. The sprockets 41, 45, and 46 are then adjusted to the proper distance from the center of the cut, and the sprocket 40 is adjusted to give the proper tension to the link-belts.

To move the machine rearward at high speed, all of the clutches are thrown out with the exception of the clutch 197, which is thrown in to drive the machine rearwardly at high speed through the spiral gears 196 and 198, the shaft 199 and spur-gears 201, shaft 182, worm 183, worm-wheel 184, shaft 185, worm 186, worm-wheel 187, shaft 188, sprocket 189, sprocket-chain 190, differential 191, shaft 192, sprocket 193, sprocket-chain 194, and driving connection 195.

This quick rearward movement of the machine is very desirable as it is often necessary to run the machine back quickly to make changes or to prevent the machine from becoming buried by a cave-in.

The quick-forward movement is also desirable, as it saves time by enabling the machine to be moved quickly back into cutting position.

During this quick rearward travel, the clutch 202 is loose and the spiral gear 180 accordingly rotates freely on the shaft 179. When the machine is driven forward, the spiral gear 156 rotates freely on the shaft 155, as the clutch 197 is loose, the gear 196 being driven from the shaft 182 through the spur-gears 201, 200, shaft 199, and spiral gear 198.

Blocks 223 may be provided for the caterpillars to travel on, the blocks 223 resting on cross-pieces 224 having their lower surfaces curved to conform to the bore of the tunnel. It has been found desirable to provide rails 225 for the rear wheels 31 to travel on, although plain traction wheels running on the cross-pieces 224 may be used.

In the form of Fig. 16 provision is made for the excavation of what is known as the horse-shoe shaped bore of tunnels. In this form the construction is the same as in the form just described with the exception of the mounting for the sprockets for the lower run of the link-belt pick-up mechanism, and the provision of cutters on the link-belt which carries the pick-up buckets for cutting out the corners of the bore. The link-belt 38, buckets 39, sprockets 40, 42, 43, 44, and 47, angle-irons 54, frame 60, links 67, 69, 75 and 88 and the arms 86 and angle-iron 92 may be the same as in the form previously described. Large sprockets 226 and 227 are substituted for the smaller sprockets 41 and 45 of the previously-described construction. These sprockets 226 and 227 guide the pick-up buckets at the points where the sides of the bore meet the bottoms of the buckets.

In order to make the pick-up buckets follow the desired curve at the bottom of the bore, tracks 228 and 229 are secured to the arms 66 and 75, respectively, for guiding the link-belts. These tracks may be channel-irons, as shown in Figs. 18 and 19, in which travel rollers 230 secured to the sides of the buckets 39, or they may be angle-irons around which the rollers travel as shown in Fig. 20, or as shown in Fig. 17, the links of the chain may directly engage the guide which may be of any suitable shape.

In order to dig out the corners of the bore which extend beyond that part of the bore reached by the cutters attached to the boring-head, cutting knives 231 are secured to the links in the link-chain by means of the bracket or support 232 and to the buckets 39 by the bracket 233. A trimmer end 234 is formed on the end of the cutter 231 for smoothing up the perimeter of the bore. In Fig. 20 a different form of cutter 235 is shown, thus cutter being U-shaped and secured to the link chain 38 on both sides, as indicated at 236 and 237.

The operation of the pick-up mechanism for the horse-shoe-shaped bores is substantially the same as in the form previously described, except that in addition to carrying the pick-up buckets which pick up the material excavated by the boring mechanism, the link-belts 38 carry the cutters 231 which excavate that portion of the bore outside the circle cut by the boring mechanism 21. Each cutter 231 in its travels shaves off a thin layer from that part of the face of the cut outside the circle of the boring mechanism. The trimming portion 234 of the blade 231 trues up the perimeter of the bore. The material excavated by the knives 231 is picked up by the buckets 39 along with the material excavated by the boring mechanism.

Having thus described my invention what I claim as new and desire to secure by Letters Patent is:

1. A tunneling machine comprising a rotary excavating tool, an endless-belt pick-up mechanism operating in a plane transverse to the axis of the tunnel for picking up the excavated material, a pivotally-mounted arm, means for securing said arm in various adjusted positions, and guide-means for said endless belt supported by said pivoted arm.

2. A tunneling machine comprising a rotary excavating tool, an endless-belt pick-up mechanism operating in a plane transverse to the axis of the tunnel for picking up the excavated material, a pivoted arm, and rotatable guide-means for said endless belt supported by said pivoted arm.

3. A tunneling machine comprising a substantially horizontal shaft, a rotary excavating tool secured to said shaft, an endless-belt pick-up mechanism for picking up the excavated material, a vertically-adjustable frame, guide-means for said endless-belt supported by said frame, an arm pivoted to said frame, and additional guide-means for said endless belt supported by said arm.

4. A tunneling machine comprising boring mechanism for making a circular cut, and endless belt mechanism following said boring mechanism and extending beyond said circular cut for making an irregular bore.

5. A tunneling machine comprising boring mechanism for making a cut, and endless belt mechanism for making a cut in the rear of said boring mechanism, extending beyond the cut made by said boring mechanism.

6. A tunneling machine for making a substantially horizontal tunnel comprising a cutter-head rotatable about a substantially horizontal axis for loosening the material at the face of the cut, means for picking up the loosened material which falls to the bottom of the bore, comprising an endless belt pick-up mechanism operating in a plane transverse to the axis of the tunnel, means for causing said pick-up mechanism to travel in a definite path at the bottom of said bore, and means whereby the path of said pick-up mechanism at the bottom of said bore may be varied to enable it to be used with tunnels having bores of different dimensions.

7. A tunneling machine for making a substantially horizontal tunnel, comprising a cutter-head rotatable about a substantially horizontal axis for loosening the material at the face of the cut, means for picking up the loosened material which falls to the bottom of the bore comprising an endless belt pick-up mechanism operating in a plane transverse to the axis of the tunnel, means for causing said pick-up mechanism to travel in a definite path at the bottom of the bore, and means whereby the path of said pick-up mechanism at the bottom of the bore may be varied to enable it to be used with tunnels having bores of different dimensions, said last means comprising adjustable means for guiding said endless belt during its travel at the bottom of the bore.

8. A tunneling machine for making a substantially horizontal tunnel, comprising a cutter-head rotatable about a substantially horizontal axis for loosening the material at the face of the cut, means for picking up the loosened material which falls to the bottom of the bore comprising an endless belt pick-up mechanism operating in a plane transverse to the axis of the tunnel, means for causing said pick-up mechanism to travel in a definite path at the bottom of the bore, and means whereby the path of said pick-up mechanism at the bottom of the bore may be varied to enable it to be used with tunnels having bores of different dimensions, said last means comprising adjustable means for guiding said endless belt during its travel at the bottom of the bore, and adjustable means comprising rotatable means for guiding said endless belt, and means whereby the axis of said rotatable means may be shifted to vary the travel of said belt.

9. A tunneling machine for making a substantially horizontal tunnel comprising a cutter-head rotatable about a substantially horizontal axis for loosening the material at the face of the cut, means for picking up the loosened material which falls to the bottom of the bore comprising a link belt pick-up mechanism operating in a plane transverse to the axis of the tunnel, means for causing said pick-up mechanism to travel in a definite path at the bottom of said bore, and means whereby the path of said pick-up mechanism at the bottom of the bore may be varied to enable it to be used with tunnels having bores of different dimensions, said means comprising a sprocket and means for shifting said sprocket so that the distance from the axis of said cutter-head may be varied.

10. A tunneling machine for making a substantially horizontal tunnel comprising a cutter-head rotatable about a substantially horizontal axis for loosening the material at the face of the cut, means for picking up the loosened material which falls to the bottom of the bore comprising an endless belt operating in a plane transverse to the axis of the tunnel, means for causing said endless belt to travel in a definite path at the bottom of said bore, and means whereby the path of said belt at the bottom of said bore may be varied to enable it to be used with tunnels having bores of different dimensions, comprising vertically adjustable means for guiding said endless belt.

11. A tunneling machine for making a substantially horizontal tunnel, comprising a cutter-head rotatable about a substantially horizontal axis for loosening the material at the face of the cut, means for picking up the loosened material which falls to the bottom of the bore comprising an endless belt pick-up mechanism operating in a plane transverse to the axis of the tunnel, means for causing said endless belt to travel in a definite path at the bottom of said bore, and means whereby the path of said endless belt at the bottom of the bore may be varied to enable it to be used with tunnels having bores of different dimensions, said means comprising a vertically adjustable frame, and guiding means supported by said frame for guiding said endless belt.

12. A tunneling machine for making a substantially horizontal tunnel comprising a cutter-head rotatable about a substantially horizontal axis for loosening the material at the face of the cut, means for picking up the loosened material which falls to the bottom of the bore, comprising an endless belt pick-up mechanism operating in a plane transverse to the axis of the tunnel, means for causing said endless belt to travel in a definite path at the bottom of said bore, and means whereby the path of said endless belt at the bottom of said bore may be varied to enable it to be used with tunnels having bores of different dimensions, said means comprising a vertically adjustable frame, and rotatable guide means supported by said frame for guiding said endless belt.

In witness whereof, I have hereunto subscribed my name.

LOUIS W. ANDERSON.

Witnesses:
J. C. SHINKMAN,
GEORGE E. SOWLER.